US008315026B2

(12) United States Patent
Roth et al.

(10) Patent No.: US 8,315,026 B2
(45) Date of Patent: Nov. 20, 2012

(54) SEMICONDUCTOR DEVICE AND APPARATUS INCLUDING SEMICONDUCTOR DEVICE

(75) Inventors: Andreas Roth, Guenzenhausen (DE); Hubert Bode, Haar (DE); Andreas Laudenbach, Haag (DE); Stephan Lehmann, Garching (DE); Engelbert Wittich, Wartenberg (DE)

(73) Assignee: Freescale Semiconductor, Inc., Austin, TX (US)

( * ) Notice: Subject to any disclaimer, the term of this patent is extended or adjusted under 35 U.S.C. 154(b) by 195 days.

(21) Appl. No.: 12/745,973

(22) PCT Filed: Nov. 27, 2008

(86) PCT No.: PCT/IB2008/054987

§ 371 (c)(1), (2), (4) Date: Jun. 3, 2010

(87) PCT Pub. No.: WO2009/072041

PCT Pub. Date: Jun. 11, 2009

(65) Prior Publication Data

US 2010/0253422 A1 Oct. 7, 2010

(30) Foreign Application Priority Data

Dec. 6, 2007 (WO) ................ PCT/IB2007/054949

(51) Int. Cl.
*H02H 3/22* (2006.01)

(52) U.S. Cl. ......................................... 361/56; 361/111

(58) Field of Classification Search .................... 361/56, 361/111; 257/355–360

See application file for complete search history.

(56) References Cited

U.S. PATENT DOCUMENTS

| | | | | |
|---|---|---|---|---|
| 4,353,105 | A | 10/1982 | Black | |
| 5,168,340 | A | 12/1992 | Nishimura | |
| 5,173,149 | A * | 12/1992 | Nojiri et al. | 205/644 |
| 5,621,742 | A | 4/1997 | Yoshino | |
| 6,275,972 | B1 * | 8/2001 | Long et al. | 324/762.09 |
| 7,232,526 | B2 * | 6/2007 | Livengood et al. | 216/62 |
| 2003/0222703 | A1 | 12/2003 | Ker et al. | |
| 2007/0164774 | A1 | 7/2007 | Cecchi | |
| 2007/0188961 | A1 * | 8/2007 | Tailliet | 361/100 |

FOREIGN PATENT DOCUMENTS

| | | | |
|---|---|---|---|
| DE | 19958204 | A1 | 6/2001 |
| JP | 02188130 | A | 7/1990 |
| JP | 03108368 | A | 5/1991 |
| JP | 05038039 | A | 2/1993 |
| JP | 08255872 | A | 10/1996 |
| WO | 2007/047804 | A | 4/2007 |

OTHER PUBLICATIONS

International Search Report and Written Opinion correlating to PCT/IB2008/054987 dated Apr. 8, 2009.

* cited by examiner

*Primary Examiner* — Danny Nguyen

(57) ABSTRACT

A semiconductor device includes a substrate on which an electronic circuit is provided. Two or more pads may be present which can connect the electronic circuit to an external device outside the substrate. A current meter is electrically in contact with at least a part of the substrate and/or the pad. The meter can measure a parameter forming a measure for an aggregate amount of a current flowing between the substrate and said pads. A control unit is connected to the current meter and the electronic circuit, for controlling the electronic circuit based on the measured parameter.

20 Claims, 2 Drawing Sheets

SEMICONDUCTOR DEVICE AND APPARATUS INCLUDING SEMICONDUCTOR DEVICE

FIELD OF THE INVENTION

This invention relates to a semiconductor device and to an apparatus including a semiconductor device.

BACKGROUND OF THE INVENTION

Semiconductor integrated circuits are known in the art. Typically, integrated circuits include a package which contains one or more substrates or "dies". The substrates may be provided with electronic circuits and be provided with pads via which the substrates (and the electronic circuits) can be connected to the outside world, e.g. via bond-wires that are connected to pins which extend from the package inside to the exterior of the package.

However, a general problem is that current may be injected into the substrate, for example when a pad is driven below or above the supply voltage, which may affect the operation of the electronic circuit.

In order to prevent the injected current from affecting the operation, it is known to implement a so called "guard ring" which shields the electronic circuit from the injected current. For example, U.S. Pat. No. 5,168,340 describes a passive latch-up protection improvement in which polysilicon lines cross or cut a guard-ring around a logic circuit. When an amount of injected current exceeds a certain magnitude, latch up of the transistors in the logic circuit occurs and the transistors are shut off.

German patent application publication DE199 58 204 A1 discloses an integrated circuit provided with a sensor which senses the voltage of a pin and a transistor which is controlled by the sensor to block the connection between the pin and a core part of the integrated circuit when the voltage exceeds a first voltage threshold or comes below a second voltage threshold.

However, this does not provide a protection of the core part to currents flowing from the pin to the core part via other paths than the connection. In addition, if despite the blocked connection the core part is subject to an injected current, the operation of the core part can be affected in an unpredictable manner. Furthermore, since the path from the pin to the core parts is cut, a normal functioning of the device is no longer possible.

SUMMARY OF THE INVENTION

The present invention provides a semiconductor device and an apparatus as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings.

DETAILED DESCRIPTION OF THE PREFERRED EMBODIMENTS

Figure 1:
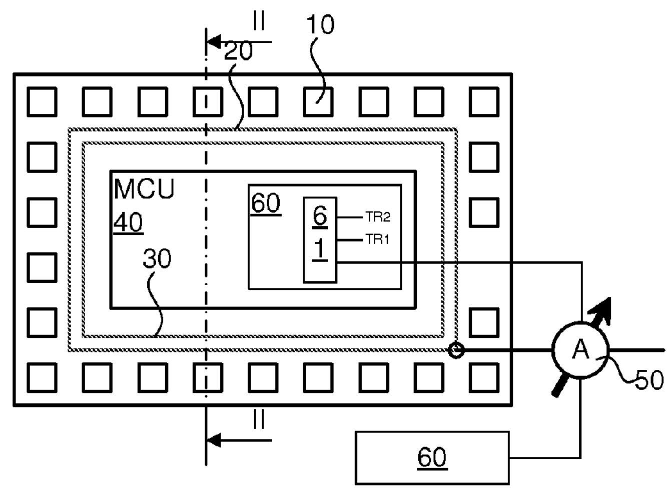
FIG. 1 schematically shows top-view of a first example of an embodiment of a semiconductor device FIG. 2 schematically shows a cross-sectional view of the example of FIG. 1 taken along a part of the line II-II in FIG. 1.

Referring to FIG. 1, a semiconductor device is shown. The semiconductor device may include a substrate 1 on which an electronic circuit 40 is provided. In this example, the electronic circuit 40 is a logic circuit. The logic circuit may for example be a microprocessor and may for example include a central processing unit (CPU) and/or a coprocessor and/or a digital signal processor and/or an embedded processor. The electronic circuit 40 may also include a microcontroller (μC). In addition to or as an alternative to the logic circuit, other devices and/or circuitry may be present in the electronic circuit 40, such as for example high voltage device and/or volatile or non-volatile memory and/or analog circuitry. Also, other electronic circuits may be present on the substrate 1.

As shown in FIG. 1, the semiconductor device may include multiple pads 10. Via the pads, the electronic circuit 40 may be connected to an external device outside the substrate. Although not shown in FIG. 1, it will be apparent that an electrically conducting path, such as a metal line may be present between the pads 10 and the part of the electronic circuit 40 that has to receive signals from the external device and/or has to output signals to the external device. The external device may be any type of device, and may for example be a type of device that, e.g. unintentionally, may inject current into the substrate 1. The external device may for example be one or more of: an electronic device, an electro-motor, a piezo-electric device, a coil, a sensor, an actuator or other suitable type of device.

As shown in FIG. 1, the semiconductor device may include a current meter 50 which is electrically in contact with at least a part of the substrate 1 and/or the pad 10. The current meter 50 may measure a parameter forming a measure for an aggregate amount of current, from hereon referred to as the injected current, flowing between the substrate 1 and the pads 10. The semiconductor device may include a control unit 60 connected to the current meter 50 and the electronic circuit 40. The control unit 60 may control the electronic circuit based on the measured parameter. The current meter 50 may for example be connected with a meter input to a part of the substrate 1 where at least a part of the injected current flows and be connected with an output to an input of the control unit 60

Thus, the control unit 60 may, for example, take measures which prevent the electronic circuit from performing in an abrupt and unpredictable manner or which prevent a loss of data when the electronic circuit comes to a halt due to the injected current. The control unit 60 may for example control the operating mode of the electronic circuit 40. The control unit 60 may for example switch the electronic circuit 40 to a more secure mode when a certain amount of current flow is detected or cause the electronic circuit 40 to store data processing information in a non-volatile memory. Also, the control unit 60 may stop or halt the operating of the electronic device 40 (and e.g. cause a redundant electronic device to take over the operation) until the level of injected current is below a safe operating threshold.

The electronic circuit may for instance have a normal mode and one, two or more non-normal modes. For example, the electronic circuit may have an multiple of non-normal modes in addition to the normal mode. The electronic circuit may be put in a selected non-normal mode based on the measured amount of current. For example, the non-normal modes may be have different levels of safety. The non-normal mode may then be selected with the levels of safety proportional to the measured amount. For example. the non-normal may for example be (in order of safety level) e.g. a watch mode, an analog measure disabled mode, a no RAM access mode, a no flash access mode, a security halt mode. In the watch mode, the injected current may be measured continuously. In the analog measure disabled mode, analog components may be switched off. In the no RAM access mode the Random Access Memory (RAM) may be disabled. In the no flash access mode, the access to flash memory may be blocked and in the security halt mode the electronic circuit may be halted.

The control unit 60 may include a selection unit and a mode-controller 61 connected to the current meter 50. In FIG. 1, the selection unit and the mode-controller are shown as a single module 61, however it will be apparent that they may be provided as separate modules. The selection unit 61 may for example select a non-normal mode based on the measured parameter. As shown in FIG. 1, the selection unit 61 may for example compare the measured amount of current with two or more threshold values Tr1, Tr2 and select the non-normal mode depending on which threshold values are exceeded (e.g. select a less secure mode if a lower threshold Tr1 is exceeded and select a more secure mode if a higher threshold Tr2 is exceeded. The mode controller may then control the electronic circuit 40 to be in a selected non-normal mode.

As shown in FIG. 1, the control unit 60 or a part thereof, e.g. the mode controller and/or the selection unit, may be part of the electronic circuit 40. For example, the mode-controller may be (at least partially) implemented as a logic circuit which forms a part of the electronic circuit 40.

Figure 2:
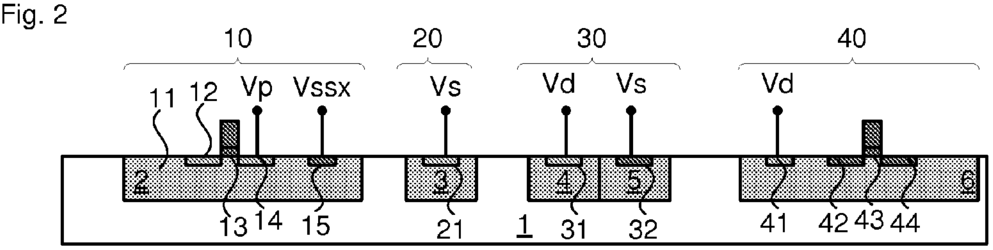

As shown in FIGS. 1 and 2, the semiconductor device may include a current sensor 20 which is connected to the current meter 50. In the example of FIG. 2 the sensor 20 is connected to the input of the current meter 50 and provides a signal which represents the amount of current sensed by the sensor. The current sensor 20 may for example, as shown in FIG. 2, include a portion 3, from hereon referred to as the sensor portion, of the substrate 1. As shown, the sensor portion 3 may be positioned between the pad 10 and the electronic circuit 40 and be part of a path for the injected current. The sensor portion 3 may for example be a region of the substrate 1 which attracts (at least a part of) the injected current. For example, the portion 3 may form a diode together with a substrate portion 2, from hereon referred to as the pad portion surrounding the pad 10. In the example of FIG. 2, for example, the sensor portion 3 is provided with a first type of doping and the pad portion 2 is provided with an opposite type of doping, the portions 2,3 thus forming a junction diode, e.g. a P-N junction diode. As indicated in FIG. 2, for example a voltage Vssx may be applied to the pad portion 2 via a contact 15 and a voltage Vs may be applied to the sensor portion 3 via a contact 21, such that the junction diode is forward biased and a current injected at the pad 10 flows to the contact 21. In the shown example, the pad 10 has a contact 14 at which a pad voltage Vp can be provided and which is a current terminal of a field effect transistor 11 of which a gate 13 and another current terminal 12 are shown in FIG. 2. In this example, the pad portion 2 may e.g. be provided with a doping of a type similar to the doping type of the substrate but at a higher concentration. The contact 15 may for example be doped with the same type of doping as the pad portion 2 but with a higher concentration. The current terminals 12,14 may e.g be doped with a type opposite to that of the substrate 1 and/or the portion 2 and/or similar to the doping of the sensor portion 3. The pad portion 2 may thus be a well (e.g. a p-well) for the transistor 11. In the sensor portion 3 a contact may be provided which is provided with the same type of doping but at a higher concentration, the sensor portion 3 thus forming a well (e.g. an n-well) for the contact.

It should be noted that the drawings are not on scale. It has been found that an effective detection may be obtained when the distance between the sensor portion 3 and the pad portion 2 is (much) smaller than the distance between the pad portion 2 and the circuit region 6.

As shown, the electronic circuit 40 may be provided in a circuit region 6 of the substrate 1, which may for example have a doping of a type opposite to the doping of the pad portion 2. A contact 41 may be present via which the circuit region 6 can be positively or negatively biased with a voltage Vd. For illustrative purposes, a FET with source 42, gate 43 and drain 44 is shown which forms a part of the electronic circuit 40.

The sensor may collect the currents injected at multiple pins and thereby used to detect or determine the aggregate amount of the pins together. Supposing, for example, that the pad portion and the substrate have been doped with a p-type doping, the terminal 14 with an n-type doping and the sensor portion 3 with an n-type doping, in case minority charge carriers are injected at the contact 14 with an energy sufficient to break through the contact-, pad junction, the current from the pad 10 will flow contact 14 (e.g. the drain) through the pad portion 2 into the substrate 1, i.e. through the diode formed by the contact 14 and the pad portion 2 (which may also be referred to as the body of the transistor 11) into the substrate 1 instead of flowing to the electronic circuit 40 via the electrically conducting path between the pad 10 and the electronic circuit 40. The minority carriers get attracted by the opposite potential of the contact 14 (doped opposite to the substrate 1) and can flow through the forward biased diode formed by the substrate 1 and the portion 3 into the contact 21. This way the minority carriers flowing from the pads into the substrate can be collected and accordingly the aggregate amount of current flowing between said substrate (1) and said pads (10) be determined.

Figure 5:
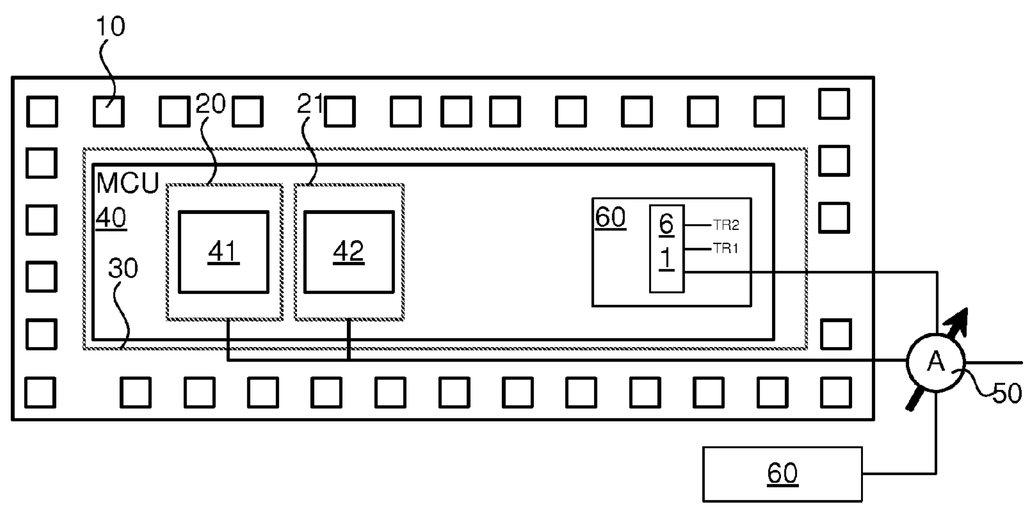
FIG. 5 schematically shows top-view of a second example of an embodiment of a semiconductor device

The sensor portion 3 may for example be a global sensor which detects the aggregate amount of current flowing from multiple pads towards a supervised area of the circuit region 6. The sensor portion may for example have a strip-like shape which defines at least a part of such an area. As shown in FIG. 1, the sensor portion 3 may for example at least partially shield the electronic circuit 40 from current injected at multiple pads 10 together. In the example of FIG. 1, for instance the sensor portion 3 surrounds the electronic circuit 40 and has the form of a ring. The ring may have any closed-loop or open loop type of shape that separates the substrate into a circuit region in which the electronic circuit 40 is present and a pad region where the pads 10 are provided. The ring shape may be continuous or be interrupted, for example to provide for electrically conducting paths between the electronic device 40 and the pads 10. As shown in the example of FIG. 5, the sensor portion may also be split into separate or additional rings 20,21 (continuous or interrupted) around sensitive parts 41,42 of the electronic circuit 40. The parts 41,42 may for example be analog or digital circuits which are critical to the operation of the circuit 40. The rings 20,21 may, as shown, be connected to the same current meter or to different current meters and generally allow to determine or detect the aggregate amount of current flowing from the pads to the respective part 40,41.

As mentioned, the electronic circuit may include a logic circuit, such as a microprocessor. In such a case, the current meter 50 may include an analogue to digital converter which is connected to the logic circuit. In the example of FIG. 1, for example, the current meter 50 is connected to a part 60 of the microprocessor which is provided with an ADC. Thereby, a component of the microprocessor (or another type of logic circuit) may be used and the need to provide for a separate ADC is obviated.

The substrate 1 may (e.g. in addition to the sensing portion 3) include a guard ring barrier 30 between the pad 10 and the electronic circuit 40. The guard ring barrier 30 may at least partially inhibit a current flow between the pad and the electronic circuit. As shown in FIG. 2, for example, the guard ring barrier 30 includes a first barrier region 4 which is provided with a first type of doping and a second barrier region 5 which is provided with an opposite doping. In the example of FIG. 2, the region 5 abuts the first barrier regions 4 and the barrier regions 4,5 form a junction diode, e.g. a N-P junction diode. As shown, the barrier regions 4,5 are provided with respective electrical contacts 31,32 via which voltages Vd,Vs can be applied such that the diode is in reverse with respect to current injected at a pad 10 and hence the electrical circuit 40 is at least partially shielded from the current. The first barrier region 4 and the sensor portion 3 may have the same type of doping and the pad portion 2 and the second barrier region 5 may have the same type of doping (i.e. opposite to the type of doping in the first barrier region 4 and the sensor portion 3).

It has been found that an effective detection as well as an effective protection may be obtained when the distance a between the sensor portion 3 and the pad portion 2 is (much) smaller than the distance c between the pad portion 2 and the circuit region 6 and than the distance b between the guard ring and the circuit region 6, e.g. a<<b<<c.

Figure 3:
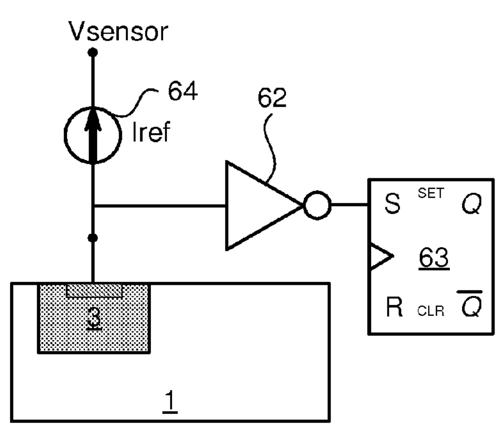
FIG. 3 schematically shows a first example of a circuit which may be used in the example of FIGS. 1 and 2.

The semiconductor device may include a sensor for sensing the current flowing between the substrate and one or more of the one or more pad and a detector connected to the sensor, for detecting that the current exceeds a current threshold and outputting to the electronic circuit a signal suitable to be processed by the electronic circuit, such as an interrupt request, when the current exceeds the threshold. As shown in FIG. 3, a detector 62-64 may for example be connected with an input to the sensor portion 3. The detector may detect that the current sensed by the sensor portion 3 exceeds a current threshold and output a threshold exceeded signal.

In the example of FIG. 3, the detector includes an inverter 62 and an edge triggered bistable or flip-flop 63, in this example an RS flip-flop. As shown, the inverter 62 may be connected with the inverter output to an input S of the flip-flop 63. The inverter input may further be connected to a voltage source via a reference current source 64. The voltage source provides a sensor voltage Vsensor and the reference current source 64 provides a reference current Iref. The reference current source 64 pulls the potential of the sensor portion 3 to the voltage level Vsensor when no current is injected. In case a current is detected in the sensor portion 3, the potential will change, in which case the output of the flip-flop 63 will switch In the shown example, the inverter 62 is directly connected, with its input, to the sensor portion 3 and forms a "digital" comparator. If the current due to injection exceeds the current of the current source, the input of the inverter 62 is pulled low and the output of the inverter 62 will switch. To filter the event, the inverter 62 drives the set input S of the flip-flop 63. The output Q,$\overline{Q}$ of the flip-flop 63 can be used as e.g. an interrupt source of the electronic circuit 40 and may for example be connected to an interrupt controller or to an interrupt handling module in the electronic circuit 40 or in an external device.

Figure 4:
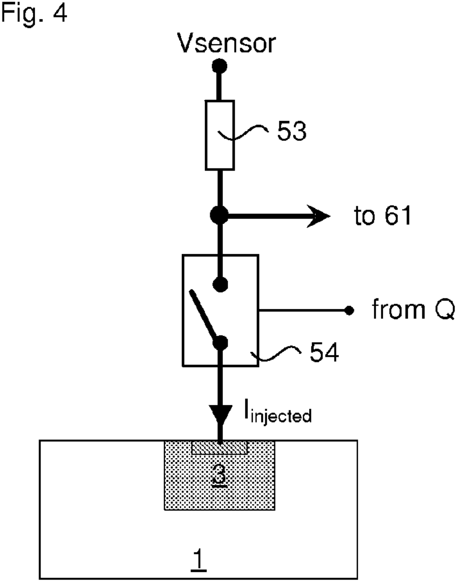
FIG. 4 schematically illustrates shows a second example of a circuit which may be used in the example of FIGS. 1 and 2.

As illustrated in FIG. 4, the semiconductor device may include a current meter controller which is connected to the detector and to the current meter, for activating the current meter when the current exceeds the threshold. The current meter controller may be connected with an input to an output of the detector. At the input, the current meter controller may receive a signal indicating that the amount of injected current exceeds a threshold value. An output of the controller may be connected to a current meter control, via which the current meter can be enabled or disabled.

In the example of FIG. 4, the current meter includes a current sensing resistor 53 which connects sensor portion 3 to a voltage source which provides a sensor voltage Vsensor. The voltage difference between both sides of the resistor 53 is proportional to the amount of injected current sensed by the sensor portion 3. In case the electronic circuit 40 is a logic circuit, the node of the resistor 53 which is not connected to the sensor Voltage may be connected to a measuring device (separate or already present, such as to an analogue to digital converter (ADC) on the electronic circuit 40, not shown in FIG. 3), which in turn may be connected to the mode controller 61.

In the example of FIG. 4, for instance the current meter controller includes the flip-flop 64. As shown in FIG. 4, a switch 54 connects the sensor portion 3 to a current meter. The switch 54 has a control input via which the state of the switch 54 can be controlled. In FIG. 4, the switch 54 is shown in an open state in which the sensor portion 3 is disconnected from the current meter, e.g. in this example from the sensing resistor 53. In a closed state the sensor portion 3 is disconnected from the sensing resistor 53. As indicated, the control input of the switch 54 is connected to the output Q of the flip-flop 63 shown in FIG. 3. Thus, when the output Q is asserted, the switch 54 may be in the closed state and the current meter may be active, whereas when the output Q is de-asserted the switch 54 may be in the open state and the current meter may be inactive. The terms "assert" (or "set") and/or "de-assert" (or "negate" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one. Accordingly, the current meter may be active only when the amount of injected current exceeds the threshold value set by the detector.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections may be an type of connection suitable to transfer signals from or to the respective nodes, units or devices, for example via intermediate devices. Accordingly, unless implied or stated otherwise the connections may for example be direct connections or indirect connections.

Also, for example, other current meters, a voltage instead of a current reference, analog storage elements instead of the flip-flop or other sensor guardring constructs may be used than shown in FIGS. 2-4.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device. For example, the example of a current meter shown in FIG. 4 may be implemented using a discrete sensing resistor electrically connected to the semiconductor substrate 1

Also, devices functionally forming separate devices may be integrated in a single physical device. For example, the inverter and the flip-flop in the example of FIG. 3 may be implemented on the same semiconductor substrate.

Furthermore, the sensor and/or guardring may be implemented in a different manner than shown in the examples. For example, a sensor ring may be provided at the interior and/pr the exterior of area protected by the guardring, the guardring may be absent or integrated in the sensor, the guardring may have only one type of doping or other suitable changes may be made to the senor portion and/or the guard ring.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to advantage.

The invention claimed is:

1. A semiconductor device, comprising:

a substrate on which an electronic circuit is provided;

at least two pads for connecting the electronic circuit to an external device outside the substrate;

a current sensor for sensing a parameter forming a measure for a total amount of current flowing between said substrate and said pads; and a control unit connected to said current sensor and said electronic circuit, for controlling said electronic circuit based on said total amount of current.

2. A semiconductor device as claimed in claim 1, wherein said electronic circuit has a normal mode and at least two non-normal modes, and wherein said control unit comprises:

a selection unit connected to said current meter, for selecting a non-normal mode based on said measured parameter and a mode-controller connected to said selection unit and, for controlling said electronic circuit to be in a selected non-normal mode.

3. A semiconductor device as claimed in claim 1, wherein said electronic circuit includes a logic circuit which forms said mode-controller.

4. A semiconductor device as claimed in claim 1, wherein said current sensor includes a sensor portion of said substrate positioned between at least one of the said pads and said electronic circuit, said portion being part of a path for said injected current.

5. A semiconductor device as claimed in claim 1, wherein at least a pad portion of said substrate surrounding at least one pad of said at least two pads is provided with a doping of a first type and said portion is provided with a doping of a second type.

6. A semiconductor device as claimed in claim 4, wherein said sensor portion surrounds a circuit region of the substrate, in which circuit region said electronic circuit is present.

7. A semiconductor device as claimed in claim 1, wherein said electronic circuit includes a logic circuit and said current meter includes an analogue to digital converter connected to the logic circuit.

8. A semiconductor device as claimed in claim 7, wherein the analogue to digital converter is part of the electronic circuit.

9. A semiconductor device as claimed in claim 1, wherein said substrate includes a barrier between at least one pad of said at least two pads and the electronic circuit, said barrier at least partially inhibiting a current flow between the at least one pad and the electronic circuit.

10. A semiconductor device as claimed in claim 1, comprises:

a sensor for sensing said current flowing between said substrate and at least one of said at least two pads;

a detector connected to the sensor, for detecting that said current exceeds a current threshold; and a current meter controller connected to said detector and to said current meter, for activating said current meter when said current exceeds said threshold.

11. A semiconductor device as claimed in claim 1, comprising:

a sensor for sensing said current flowing between said substrate and at least one of said at least two pads;

a detector connected to the sensor, for detecting that said current exceeds a current threshold and outputting to said electronic circuit a signal suitable to be processed by said electronic circuit when said current exceeds said threshold.

12. A semiconductor device as claimed in claim 1, wherein said electronic circuit includes one or more of the group consisting of:

microprocessor, central processing unit, coprocessor, digital signal processor, embedded processor, microcontroller.

13. An apparatus including a semiconductor device as claimed in claim 1.

14. A semiconductor device as claimed in claim 2, wherein said electronic circuit includes a logic circuit which forms said mode-controller.

15. A semiconductor device as claimed in claim 2, wherein said current sensor includes a sensor portion of said substrate positioned between at least one of said two said pads and said electronic circuit, said portion being part of a path for said injected current.

16. A semiconductor device as claimed in claim 3, wherein said current sensor includes a sensor portion of said substrate positioned between at least one pad of said at least two pads and said electronic circuit, said portion being part of a path for said injected current.

17. A semiconductor device as claimed in claim 2, wherein at least a pad portion of said substrate surrounding at least one pad of said at least two pads is provided with a doping of a first type and said portion is provided with a doping of a second type.

18. A semiconductor device as claimed in claim 3, wherein at least a pad portion of said substrate surrounding at least one pad of said at least two pads is provided with a doping of a first type and said portion is provided with a doping of a second type.

19. A semiconductor device as claimed in claim 4, wherein at least a pad portion of said substrate surrounding at least one pad of said at least two pads is provided with a doping of a first type and said portion is provided with a doping of a second type.

20. A semiconductor device as claimed in claim 2, wherein said electronic circuit includes a logic circuit and said current meter includes an analogue to digital converter connected to the logic circuit.

* * * * *